(12) United States Patent
Feldman et al.

(10) Patent No.: US 11,113,122 B1
(45) Date of Patent: Sep. 7, 2021

(54) EVENT LOOP DIAGNOSTICS

(71) Applicant: New Relic, Inc., San Francisco, CA (US)

(72) Inventors: Allan Feldman, San Francisco, CA (US); Loren Arthur, San Francisco, CA (US); Robert Lewis, San Francisco, CA (US)

(73) Assignee: New Relic, Inc., San Francisco, CA (US)

( * ) Notice: Subject to any disclaimer, the term of this patent is extended or adjusted under 35 U.S.C. 154(b) by 4 days.

(21) Appl. No.: 16/813,571

(22) Filed: Mar. 9, 2020

(51) Int. Cl.
*G06F 9/46* (2006.01)
*G06F 9/52* (2006.01)
*G06F 9/48* (2006.01)

(52) U.S. Cl.
CPC ............... *G06F 9/52* (2013.01); *G06F 9/485* (2013.01); *G06F 9/4887* (2013.01)

(58) Field of Classification Search
CPC ........... G06F 9/52; G06F 9/485; G06F 9/4887
See application file for complete search history.

*Primary Examiner* — Gregory A Kessler
(74) *Attorney, Agent, or Firm* — Fenwick & West LLP

(57) ABSTRACT

A system monitors an event loop executing on a host and determines causes for delays in tasks of the event loop. The system may include circuitry that receives, from an agent of the host, event loop data defining suspend and resume times of the tasks of the event loop executing on the host. The circuitry determines, based on the event loop data, event loop analysis data defining execution times for each of the tasks. The circuitry determines, based on the event loop analysis data, a cause of a delay in a task of the event loop as resulting from at least one of (i) a task delay in execution of the task or (ii) a loop delay in execution of another task of the event loop.

20 Claims, 4 Drawing Sheets

EVENT LOOP DIAGNOSTICS

BACKGROUND

The disclosure generally relates to monitoring computers, and in particular to monitoring event loop architectures.

An event loop architecture allows an application to process asynchronous tasks. An application using an event loop architecture may become delayed for reasons such as network delay, task delay within a task, or loop delay caused by a task delay of another task. It is desirable to be able to determine and differentiate the different reasons that may cause delay in an event loop architecture.

SUMMARY

Embodiments relate to monitoring an event loop executing on a host and determining causes for delays in tasks of the event loop, such as network delay, task delay, or loop delay. Some embodiments include a method. The method includes, by a circuitry: receiving, from an agent of a host, event loop data defining suspend and resume times of tasks of an event loop executing on the host; determining, based on the event loop data, event loop analysis data defining execution times for each of the tasks; and determining, based on the event loop analysis data, a cause of a delay in a task of the event loop as resulting from at least one of (i) a task delay in execution of the task or (ii) a loop delay in execution of another task of the event loop.

Some embodiments include a system. The system includes circuitry configured to: receive, from an agent of a host, event loop data defining suspend and resume times of tasks of an event loop executing on the host; determine, based on the event loop data, event loop analysis data defining execution times for each of the tasks; and determine, based on the event loop analysis data, a cause of a delay in a task of the event loop as resulting from at least one of (i) a task delay in execution of the task or (ii) a loop delay in execution of another task of the event loop Some embodiments include a non-transitory computer readable storage medium having instructions encoded thereon that, when executed by a processor, configures the processor to: receive, from an agent of a host, event loop data defining suspend and resume times of tasks of an event loop executing on the host; determine, based on the event loop data, event loop analysis data defining execution times for each of the tasks; and determine, based on the event loop analysis data, a cause of a delay in a task of the event loop as resulting from at least one of (i) a task delay in execution of the task or (ii) a loop delay in execution of another task of the event loop.

DETAILED DESCRIPTION

Figure 1:
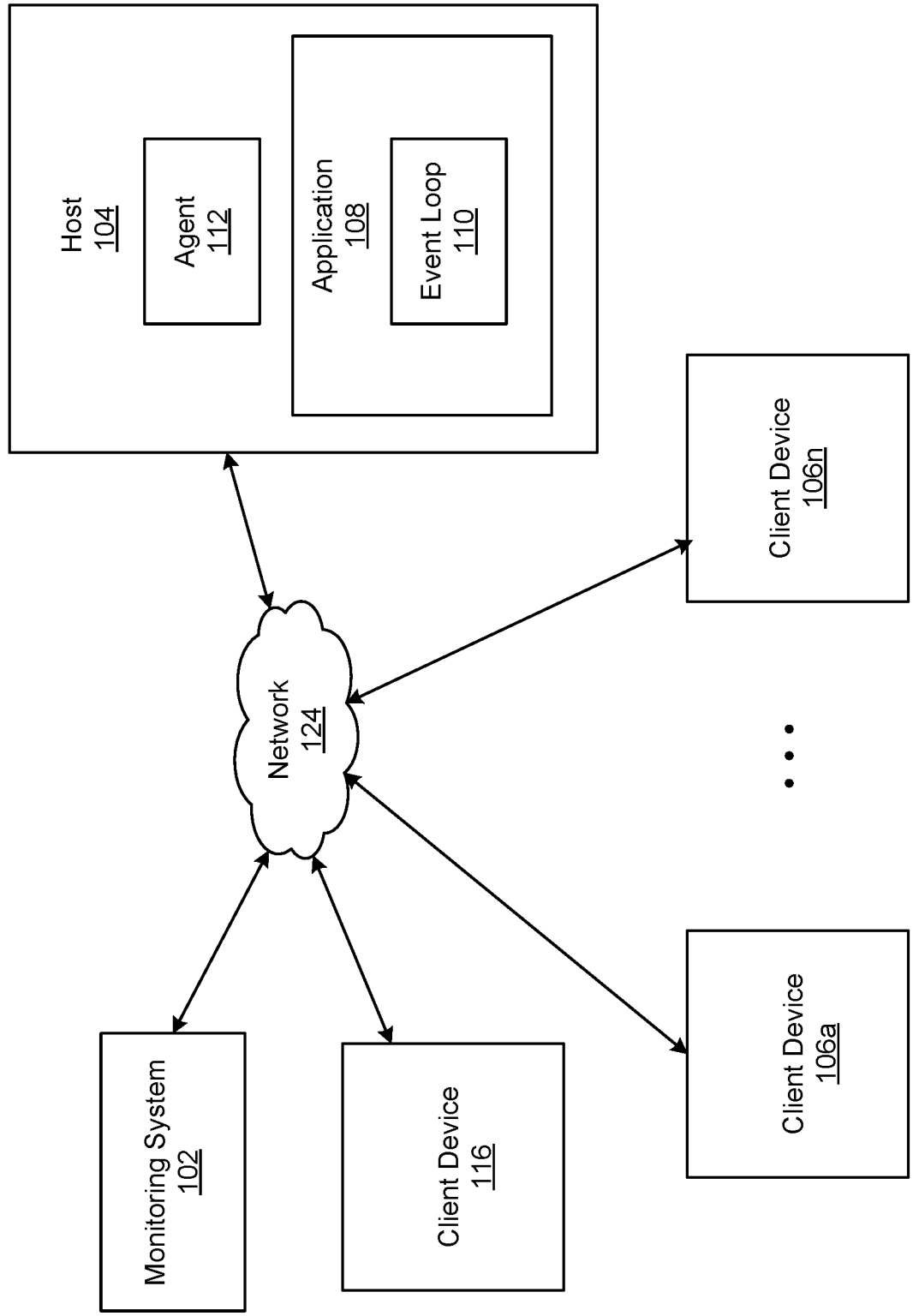
FIG. 1 is a block diagram of a system environment including an event loop architecture, according to one embodiment.

FIG. 1 is a block diagram of a system environment including an event loop architecture, according to one embodiment. The environment includes a monitoring system 102 (discussed in reference to FIG. 2), a host 106, client devices 106a-106n (each also referred to as "client device 106"), a network 124, and a client device 116. The host 104, monitoring system 102, and client devices 106 may communicate over a network 124, which may include the Internet.

The host 104 may include circuitry (e.g., one or more servers) that executes an application 108 and an agent 112 that collects data regarding the application 108. The host 106 may include one or more physical machines, one or more virtual machines, or combinations of virtual and physical machines. The application 108 includes an event loop 110 that manages the execution of multiple (e.g., asynchronous) tasks. Each task may be associated with a client device 106a through 106n.

At any given time, one of the tasks of the event loop 110 is active while the other tasks are suspended and waiting. When a task is suspended, the state of the task may be saved, and the task may later be resumed to execute from the saved state. When a task is suspended, another task of the event loop becomes active, such as by being resumed for execution by the event loop 110. When an active task cannot make further progress (e.g., because of a blocking call or some other issue), the task gives control back to the event loop 110 for execution of another task. The task may further indicate to the event loop 110 what is causing the lack of progress so that the event loop 110 may resume the task later (e.g., the blocking call to a client device has received a response).

For example, the tasks in the event loop 110 may begin with a first task associated with the client device 106a. The host 104 begins executes the first task for a duration of time but cannot make further progress, and thus suspends the first task. Upon suspension of the first task, the host 104 initiates or resumes a second task associated with a client device 106b, the second task executes for a duration of time. The second task may complete or may also need to be suspended. The host 104 may then resume the first task (e.g., if the blocking call to the client device has received a response), or the host 104 may execute a third task. This process may continue for each of the tasks of the event loop until the tasks have all completed. In some embodiments, the application 108 may include multiple event loops 110 that execute in parallel, or the host 104 may execute multiple applications 108 in parallel.

The host 104 may manage the event loop 110, such as by adding tasks and client devices to the event loop, removing tasks and client devices from the event loop, determining an order of execution for the tasks, and resuming or suspending tasks according to the order. The host 104 may manage the operation of each task, such as by resuming a task or suspending the task.

The agent 112 monitors the application 108 including event loop data associated with the tasks of the event loop 110. The event loop data may indicate information about the tasks of the event loop such as a time when a task is started, a time when the task is resumed, an execution time of a task, a time when the task is suspended, a time when the task is ended, the order of tasks, the data transferred between a client device 106 and the host 104, the response time associated with a call between the client device 106 and the host 104, the functions executed by the client device 106 or the host 104 for a task, changes in state of the application 108, the event loop 110, the client device 106, or the host 104 resulting from execution of a task, etc. The agent 112 provides the event loop data to the monitoring system 102, such as via the network 124.

In some embodiments, the agent 112 may collect other types of data associated with the host 104, such as state data. The state data may include information regarding processes running on the host 104, response time of the application 108, transactions in the application 108, the effect of back-end processes on performance of the application 108 at client devices 106, or other types of state data. The agent 112 provides the state data to the monitoring system 102.

The monitoring system 102 analyzes the event loop data regarding the event loop 110 to generate event loop analysis data. The monitoring system 102 may provide the event loop analysis data to a client device 116 (e.g., associated with an administrator of the host 104), a client device 106, the host 104, or some other computing device. For example, the monitoring system 102 may generate reports and provide user alerts based on the event loop analysis data. The report or alert may indicate that a task has executed abnormally and a reason for the abnormal execution, such as network delay for a task, task delay of a task, or loop delay caused by (e.g., a task delay or network delay) of another task. The monitoring system 102 receives the event loop data from the agent 112, processes the event loop data, and generates the reports and alerts based on the processing of the event loop data. The monitoring system 102 may provide a report or alert to a client device 106. Additional details regarding the monitoring system 102 are discussed in connection with FIG. 2.

The client devices 106*a* through 106*n* may be associated with the tasks of the event loop 110. In one example, each client device 106 communicates with the host 104 to execute a different task of the event loop 110. While a task is executing, other tasks associated with other client devices 106 are suspended.

The client device 116 may be used by an operator of the host 104 and/or the monitoring system 102. For example, the client device 116 may receive reports or alerts concerning the performance of the event loop 110 executing on the host 104 from the monitoring system 102 via the network 124.

In various embodiments, the client devices 106 or 116 may be a wired user device, such as a desktop computer, or a mobile user device, such as a laptop computer, a personal digital assistant (PDA), a mobile telephone, a smartphone, a tablet, or a wearable device. A client device 106 or 116 may include computing functionality and data communication capabilities for receiving user input as well as transmitting and/or receiving data via the network 124.

Figure 2:
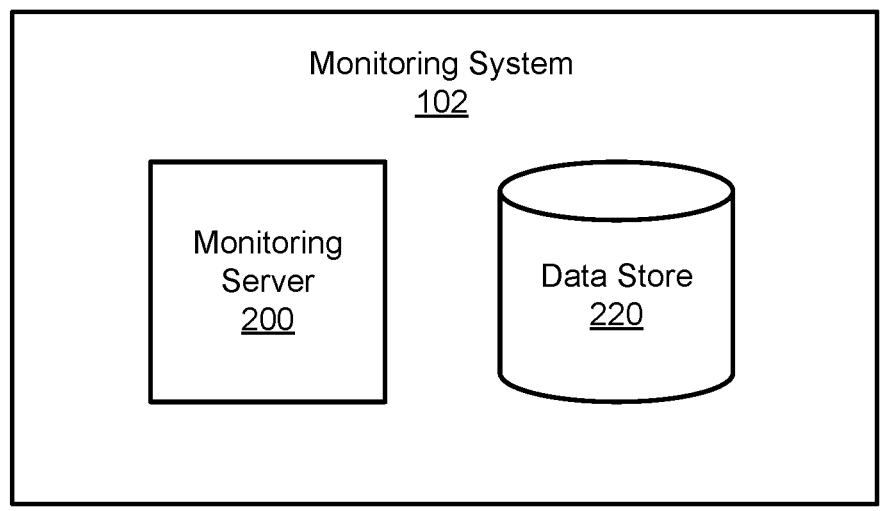
FIG. 2 is a block diagram illustrating a monitoring system that monitors an event loop architecture, according to one embodiment.

FIG. 2 is a block diagram illustrating a monitoring system 102 that monitors the event loop 110 of the host 104, according to one embodiment. The monitoring system 102 includes one or more monitoring servers 200 and one or more data stores 220.

The monitoring server 200 monitors performance of the host 104, the application 108, and the event loop 110 by communicating with the agent 112 via the network 124. The monitoring server 200 receives the event loop data from the agent 112, analyzes the event loop data to generate event loop analysis data, and generates reports and alerts based on the event loop analysis data. The monitoring server 200 may generate the event loop analysis data by comparing the event loop data with event loop parameters defining thresholds for normal functionality. The event loop analysis data may indicate a cause for delay in a task, such as network delay, task delay within a task, or loop delay (e.g., of a dependent task) caused by a task delay or network delay associated with another task.

Task delay refers to delay caused by blocking work within a function of a task itself. With respect to task delay, the event loop data may include the suspend and resume times of a task, which are used to determine an execution time of a task of the event loop. The execution time of a task may be compared with a threshold execution time for the task as defined by an event loop parameter. If the execution time exceeds the threshold execution time, the task may be determined as executing abnormally because of task delay. If the execution time fails to exceed the threshold execution time, the task may be determined as executing normally in terms of task delay.

Network delay refers to delay caused by a slow network connection. With respect to network delay, the event loop data may include a response time between the host and a client associated with a task of the event loop. The response time of a task may be compared with a threshold response time defined by an event loop parameter. If the response time exceeds the threshold response time, the task may be determined as executing abnormally because of network delay. If the response time fails to exceed the threshold response time, the task may be determined as executing normally in terms of network delay.

Loop delay refers to delay caused by work associated with another task blocking the event loop from executing a task. With respect to loop delay, the event loop data may include the suspend and resume times of each task of the event loop. These suspend and resume times may be used to determine a blocking time for a task of the event loop. The blocking time of the task may be compared with a threshold blocking time as defined by an event loop parameter. If the blocking time exceeds the threshold blocking time, the task may be determined as executing abnormally because of loop delay. If the blocking time fails to exceed the threshold blocking time, the task may be determined as executing normally in terms of loop delay.

The event loop parameters define values that are considered normal for each task. In some embodiments, the event loop parameters may be derived programmatically. For example, event loop parameters may be generated by monitoring the execution and response times of tasks over time. The same or similar types of tasks may be grouped, and threshold times for a type of task be determined based on the collecting of event loop data for the type.

The monitoring server 200 may track how long each task takes to execute, and detects when a task has executed longer than is typical or normal. The monitoring server 200 may further determine one or more causes for a task to violate an event loop parameter based on the event loop data, such as task delay, network delay, or loop delay. The report and alert regarding the event loop may include indications of the network delay, task delay, or loop delay. For network delay, the report and alert may indicate that a response time has exceeded a threshold response time, the response time, a measure of how much the threshold response time is exceeded, etc. For task delay, the report and alert may indicate that the execution time for a task has exceeded a threshold execution time, the execution time of the task, a measure of how much the threshold execution time was exceeded, etc. For loop delay, a reporting and alert may indicate that a task has been blocked by another task of the event loop, the blocking time, a measure of how much the threshold blocking time was exceeded, the cause of the delay in the other task (e.g., task, loop, or network delay), etc.

The monitoring server 200 may provide the report and alert of the event loop analysis data to a user interface of the client device 116 for view and analysis by an administrator of the host 104. The report and alert enables the administrator to address any performance issues in the host 104, application 108, event loop 110, or client device 106. In one example, the monitoring server 200 generates plots illustrating the execution times, response times, or other delays associated with tasks. The monitoring server 200 may provide an alert when a task is determined to be performing abnormally, such as to a client device 116. In some embodiments, the monitoring server 200 may facilitate programmatic remedial actions when a task is determined to be operating abnormally. For example, a task may be removed from the event loop or restarted.

In some embodiments, some or all of the functionality discussed herein for the monitoring server 200 may be performed by an agent 112. For example, the agent 112 may generate the event loop analysis data from the event loop data, and provide the event loop analysis data to the monitoring system 102 or the client device 116.

The data store 220 stores the data received and generated by the monitoring server 200, such as the event loop parameters, the event loop data, and the event loop analysis data. The monitoring server 200 may access the data store 220 to retrieve the event loop parameters, and may store the event loop data and event loop analysis data in the data store 220.

Figure 3:
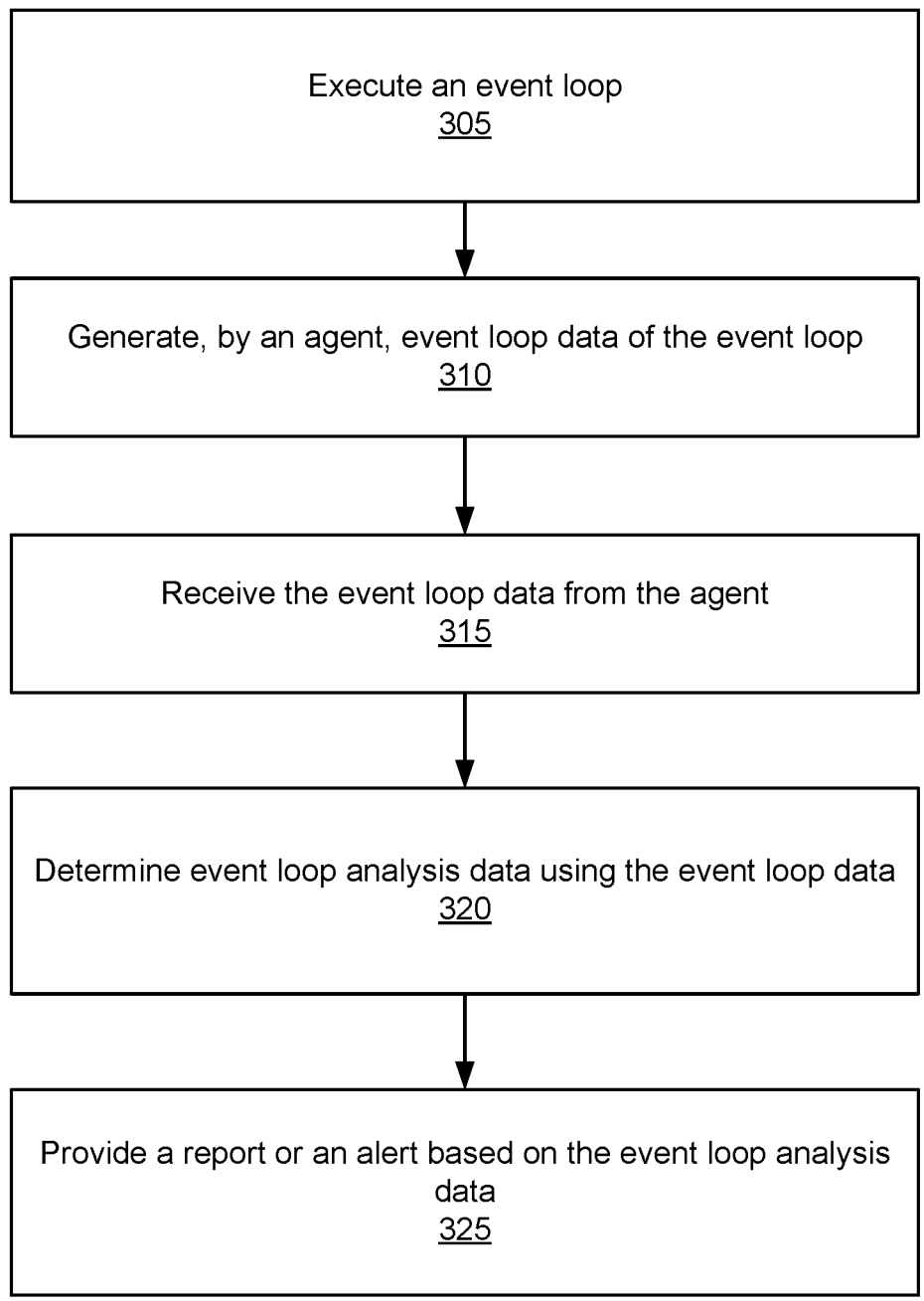
FIG. 3 is a flow chart illustrating the process for monitoring an event loop architecture, according to one embodiment.

FIG. 3 is a flow chart illustrating a process 300 for monitoring an event loop architecture, according to one embodiment. The process 300 is discussed as being performed by the computing systems shown in FIGS. 1 and 2, but other types of computing systems or devices may be used. The process 300 may include fewer or additional steps, and steps may be performed in different orders.

A host executes 305 an event loop including tasks. For example, the host may execute an application including the event loop. The event loop may include multiple tasks. Each of the tasks may be associated with a client device, and the host may communicate with the client device to execute the task. At any given time, one of the tasks may be active while the other tasks are suspended or waiting.

An agent of the host generates 310 event loop data of the event loop executing on the host. The agent monitors the activity of the event loop to generate the event loop data. The event loop data may indicate information about the tasks of the event loop such as a time when a task is started, a time when the task is resumed, an execution time of a task, a time when the task is suspended, a time when the task is ended, the order of tasks, the data transferred between a client device and the host, the response time associated with a call between the client device and the host, the cause of a blocking call in a task, the functions executed by the client device or the host for a task, changes in state of the application, the event loop, the client device, or the host resulting from execution of a task, etc. The agent may collect the event loop data for each task of the event loop.

A monitoring system receives 315 the event loop data from the agent. For example, the agent may provide the event loop data to a monitoring server of the monitoring system via a network. The network may include one or more of a wide area network (e.g., the Internet) or a local area network.

The monitoring system determines 320 event loop analysis data using the event loop data. For example, the monitoring system may generate the event loop analysis data by analyzing the event loop data for each of the tasks of the event loop. The monitoring system may compare the event loop data with event loop parameters defining thresholds for normal functioning of the tasks of the event loop. The event loop analysis data may indicate abnormal operation as caused by network delay between the host and a client device, task delay caused by execution of a task, or loop delay caused by a task delay, network delay, or loop delay of another task of the event loop.

In one example, the event loop data includes suspend and resume times for each task of the event loop. The monitoring system determines event loop analysis data defining execution times for each of the tasks of the event loop based on the suspend and resume times. The monitoring system then determines a cause of a delay in a task of the event loop as resulting from at least one of (i) a network delay in a call between the host and a client device for the task, (ii) a task delay in execution of the task, or (iii) a loop delay in execution of one or more other tasks of the event loop.

The monitoring system provides 325 a report or an alert based on the event loop analysis data. The monitoring system may provide the report or alert to a user interface of a client device, the host, or some other computing device (e.g., used by an administrator of the host). The monitoring system 102 may generate reports and provide user alerts based on the event loop analysis data. In addition to indicating abnormal behavior in a task, the report or alert may indicate a reason for the abnormal behavior such as a network delay, a task delay, or a loop delay. In some embodiments, a report or alert may be triggered based on the event loop data exceeding an event loop parameter.

Figure 4:
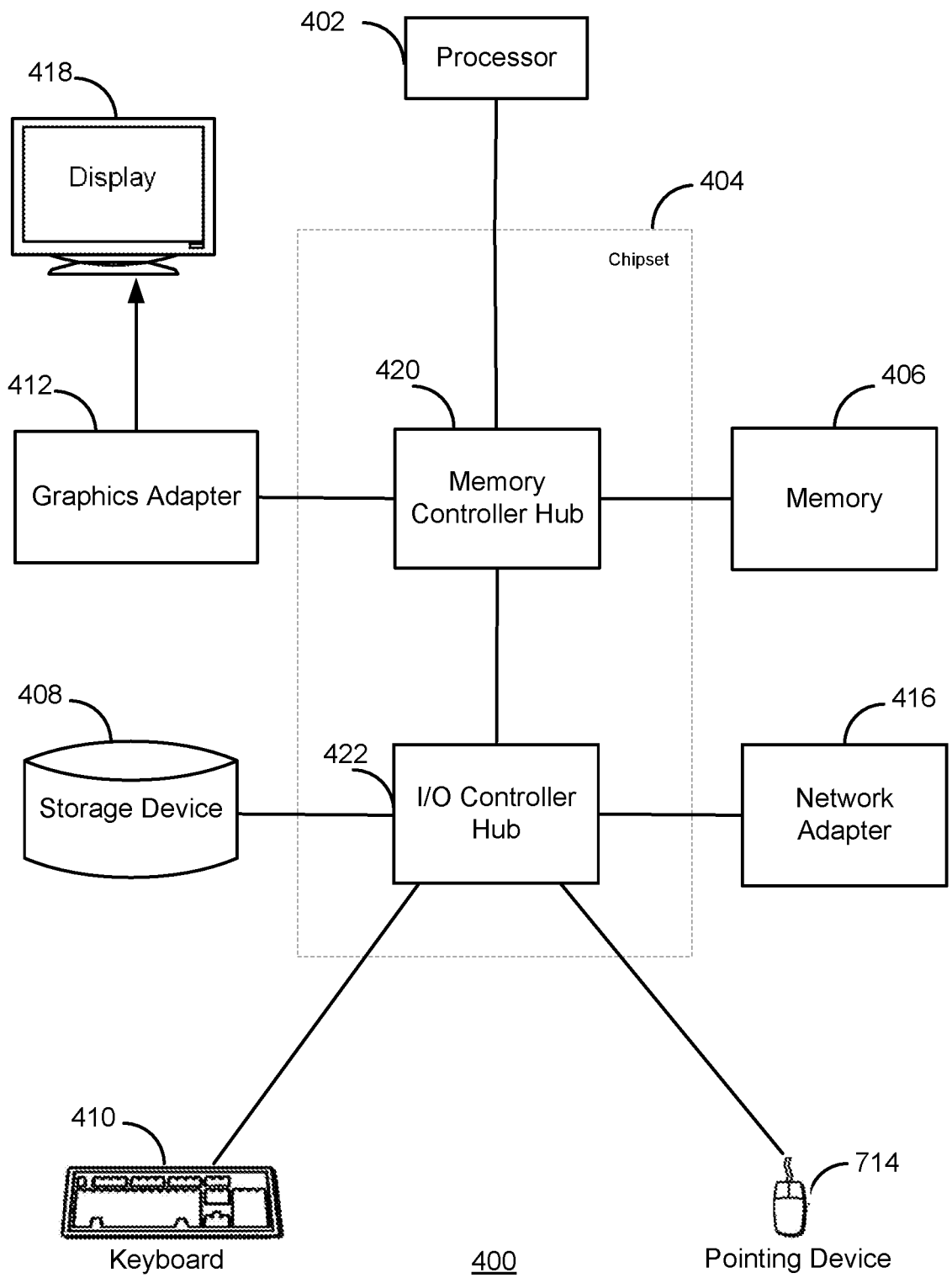
FIG. 4 is a block diagram illustrating an example of a computer, according to one embodiment.

FIG. 4 is a high-level block diagram illustrating an example of a computer 400, according to one embodiment. The computer 400 is an example of circuitry that implements components of the monitoring system 102, host 104, client device 106, or client device 116. Illustrated are at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display device 418 is coupled to the graphics adapter 412. A storage device 408, keyboard 410, pointing device 414, and network adapter 416 are coupled to the I/O controller hub 422. Other embodiments of the computer 400 have different architectures. For example, the memory 406 is directly coupled to the processor 402 in some embodiments.

The storage device 408 includes one or more non-transitory computer-readable storage media such as a hard drive, compact disk read-only memory (CD-ROM), DVD, or a solid-state memory device. The memory 406 holds instructions and data used by the processor 402. The pointing device 414 is used in combination with the keyboard 410 to input data into the computer system 400. The graphics adapter 412 displays images and other information on the display device 418. In some embodiments, the display device 418 includes a touch screen capability for receiving user input and selections. The network adapter 416 couples the computer system 400 to the network 124. Some embodiments of the computer 400 have different and/or other components than those shown in FIG. 4.

The computer 400 is adapted to execute computer program modules for providing functionality described herein. For example, some embodiments may include a computing device including one or more modules configured to perform the process 300 shown in FIG. 3. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 408, loaded into the memory 406, and executed by the processor 402.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A method, comprising, by a circuitry:
   receiving, from an agent of a host, event loop data defining suspend and resume times of tasks of an event loop executing on the host;
   determining, based on the event loop data, event loop analysis data defining execution times for each of the tasks; and
   determining, based on the event loop analysis data, a cause of a delay in a task of the event loop as resulting from at least one of (i) a task delay in execution of the task or (ii) a loop delay in execution of another task of the event loop.

2. The method of claim 1, further comprising, by the circuitry, determining the cause of the delay in the task as resulting from the task delay in execution of the task based on an execution time of the task exceeding an execution time threshold.

3. The method of claim 1, further comprising, by the circuitry, determining the cause of the delay in the task as resulting from the loop delay in execution of the other task of the event loop based on an execution time of the other task exceeding an execution time threshold.

4. The method of claim 3, further comprising, by the circuitry:
   determining a blocking time for the task based on the event loop data defining suspend and resume times of the tasks of the event loop; and
   determining the cause of the delay in the task as resulting from the loop delay in execution of the other task of the event loop based on the blocking time exceeding a blocking time threshold.

5. The method of claim 1, wherein:
   the event loop data includes a response time between the host and a client device associated with the task; and
   further comprising, by the circuitry, determining the cause of the delay in the task of the event loop as resulting from a network delay based on response time between the host and a client device associated with the task.

6. The method of claim 5, wherein determining the cause of the delay in the task of the event loop as resulting from the network delay includes determining that the response time exceeds a threshold response time.

7. The method of claim 1, wherein the host executes the task of the event loop while other tasks of the event loop are suspended.

8. The method of claim 1, wherein each task of the event loop is associated with a different client device.

9. The method of claim 1, further comprising, by the circuitry, providing at least one of a report or an alert indicating the cause of the delay in the task to a computing device via a network.

10. A system, comprising:
    circuitry configured to:
       receive, from an agent of a host, event loop data defining suspend and resume times of tasks of an event loop executing on the host;
       determine, based on the event loop data, event loop analysis data defining execution times for each of the tasks; and
       determine, based on the event loop analysis data, a cause of a delay in a task of the event loop as resulting from at least one of (i) a task delay in execution of the task or (ii) a loop delay in execution of another task of the event loop.

11. The system of claim 10, wherein the circuitry is configured to determine the cause of the delay in the task as resulting from the task delay in execution of the task based on an execution time of the task exceeding an execution time threshold.

12. The system of claim 10, wherein the circuitry is configured to determine the cause of the delay in the task as resulting from the loop delay in execution of the other task of the event loop based on an execution time of the other task exceeding an execution time threshold.

13. The system of claim 12, wherein the circuitry is further configured to:
    determine a blocking time for the task based on the event loop data defining suspend and resume times of the tasks of the event loop; and
    determine the cause of the delay in the task as resulting from the loop delay in execution of the other task of the event loop based on the blocking time exceeding a blocking time threshold.

14. The system of claim 10, wherein:
the event loop data includes a response time between the host and a client device associated with the task; and
the circuitry is further configured to determine the cause of the delay in the task of the event loop as resulting from a network delay based on response time between the host and a client device associated with the task.

15. The system of claim 14, wherein the circuitry configured to determine the cause of the delay in the task of the event loop as resulting from the network delay includes the circuitry being configured to determine that the response time exceeds a threshold response time.

16. The system of claim 10, wherein:
the host executes the task of the event loop while other tasks of the event loop are suspended; and
each task of the event loop is associated with a different client device.

17. The system of claim 10, wherein the circuitry is further configured to provide at least one of a report or an alert indicating the cause of the delay in the task to a computing device via a network.

18. A non-transitory computer readable storage medium having instructions encoded thereon that, when executed by a processor, configures the processor to:

receive, from an agent of a host, event loop data defining suspend and resume times of tasks of an event loop executing on the host;
determine, based on the event loop data, event loop analysis data defining execution times for each of the tasks; and
determine, based on the event loop analysis data, a cause of a delay in a task of the event loop as resulting from at least one of (i) a task delay in execution of the task or (ii) a loop delay in execution of another task of the event loop.

19. The non-transitory computer readable storage medium of claim 18, wherein the instructions configure the processor to determine the cause of the delay in the task as resulting from the task delay in execution of the task based on an execution time of the task exceeding an execution time threshold.

20. The non-transitory computer readable storage medium of claim 19, wherein the instructions configure the processor to determine the cause of the delay in the task as resulting from the loop delay in execution of the other task of the event loop based on an execution time of the other task exceeding an execution time threshold.

* * * * *